US012557811B2

(12) United States Patent
Zhang et al.

(10) Patent No.: US 12,557,811 B2
(45) Date of Patent: Feb. 24, 2026

(54) EFFECTIVE AND ECO-FRIENDLY DISINFECTANT

(71) Applicant: The Hong Kong University of Science and Technology, Hong Kong (CN)

(72) Inventors: Xiangru Zhang, Hong Kong (CN); Jiarui Han, Hong Kong (CN); Wanxin Li, Hong Kong (CN)

(73) Assignee: The Hong Kong University of Science and Technology, Hong Kong (CN)

( * ) Notice: Subject to any disclaimer, the term of this patent is extended or adjusted under 35 U.S.C. 154(b) by 300 days.

(21) Appl. No.: 18/522,414

(22) Filed: Nov. 29, 2023

(65) Prior Publication Data

US 2024/0196888 A1 Jun. 20, 2024

Related U.S. Application Data

(60) Provisional application No. 63/428,734, filed on Nov. 30, 2022.

(51) Int. Cl.
*A01N 29/04* (2006.01)
*A01P 3/00* (2006.01)

(52) U.S. Cl.
CPC ................ *A01N 29/04* (2013.01); *A01P 3/00* (2021.08)

(58) Field of Classification Search
CPC ................................. A01N 29/04; A01P 3/00
See application file for complete search history.

(56) References Cited

U.S. PATENT DOCUMENTS

2015/0093425 A1 4/2015 Moore
2024/0082201 A1 3/2024 Chen et al.

FOREIGN PATENT DOCUMENTS

EP 2273875 B1 3/2018

OTHER PUBLICATIONS

Shanshan et al, Determination of dihalobenzoquinones in water using gas chromatography coupled with an electronic capture detector, 2019, Chemosphere, 2015, pp. 57-61. (Year: 2019).*

R.E. Da Silva et al.; Antimicrobial and antibiofilm activity of the benzoquinone oncocalyxone A. Microbial Pathogenesis, 2020, 149, 104513.

* cited by examiner

*Primary Examiner* — Trevor Love
(74) *Attorney, Agent, or Firm* — S&F/WEHRW

(57) ABSTRACT

A disinfectant composition comprising a dihalobenzoquinone, such as 2,6-dichloro-1,4-benzoquinone, and a solvent useful in a method of treating an object suspected of being contaminated with one or more microorganisms, the method comprising contacting the object with the disinfectant composition under conditions such that the disinfectant composition inactivates at least a portion of the one or more microorganisms.

9 Claims, 5 Drawing Sheets

| Chemical | Concentration (mg $L^{-1}$) | Disinfection efficiency (log) |
| --- | --- | --- |
| 2,5-DCQ | 15 | > 5.6 |
| | 7.5 | 0.8 |
| 2,6-DCQ | 15 | 3.8 |
| | 7.5 | 0.8 |

FIG. 4

| Chemical | Concentration (mg $L^{-1}$) | Disinfection efficiency (log) |
|---|---|---|
| 2,6-DBQ | 5 | 0.4 |
| | 7.5 | 0.5 |
| | 10 | 1.2 |
| | 12.5 | 2.1 |
| 2,6-DIQ | 7.5 | 0.1 |
| | 10 | 0.4 |
| | 15 | 1.4 |
| | 20 | 2.6 |
| 2,6-DCQ | 10 | 1.7 |

FIG. 5

EFFECTIVE AND ECO-FRIENDLY DISINFECTANT

CROSS-REFERENCE TO RELATED APPLICATIONS

The present application claims priority from U.S. Provisional Patent Application No. 63/428,734, filed on Nov. 30, 2022, which is hereby incorporated by reference in its entirety.

TECHNICAL FIELD

The present disclosure generally relates to a disinfectant composition and methods of use thereof. More particularly, the present disclosure relates to dihalobenzoquinones, such as 2,6-dichloro-1,4-benzoquinone, as an active ingredient in the disinfectants, cleaners and/or sanitizer compositions.

BACKGROUND

During the global COVID-19 pandemic, household and healthcare disinfection products are in high demand to prevent transmission of the disease and protect people from the germs. Global sales of disinfectant products have increased by over 50% from pre-pandemic levels (US$ 5.45 billion per year). Because the active ingredients in disinfectant products typically enter natural aquatic environments via wastewater effluent and surface runoff, increased use of disinfectants could trigger secondary disasters in aquatic ecosystems. Therefore, there is a continuing need for disinfectants that are highly effective for various types of pathogens and eco-friendly for aquatic organisms.

Chloroxylenol, also known as para-chloro-meta-xylenol (PCMX), is a halogen-incorporated phenolic disinfectant. PCMX is sold under the brand names Walch and Dettol and is used worldwide for disinfection and sanitization. It is present in 16.9% of antiseptic detergents in the United States, 20.7% of household cleaners in the United Kingdom, and 56.3% of household disinfectants and 33.9% of hand sanitizers in China. Dettol Antiseptic Liquid contains 5% PCMX and is diluted in volume ratios of 1:20 to 1:40 with water for household hygiene in laundry, on floors, surfaces and lavatories. Over 99.9% (3-log inactivation) of germs can be removed within 5 min. Walch Multipurpose Disinfectant contains 4.5-5.5% PCMX and can be used for personal hygiene (dilute 1:150 by volume with water and soak for 15 min), household hygiene (dilute 1:100 by volume with water and soak or scrub for 10 min) and cuts and wounds (dilute 1:30 by volume with water and rub for 1 min).

Due to its widespread use and high chemical stability, PCMX has been frequently detected in aquatic environments. For example, it has been detected at 0.1-1.2 $\mu g\ L^{-1}$ in Indonesian river water, at 0.2-10.6 $\mu g\ L^{-1}$ in Hong Kong river water, and at 1.62-9.57 $\mu g\ L^{-1}$ in Mainland Chinese river water. Toxicological studies have found adverse effects of PCMX on aquatic organisms. For example, PCMX can cause mortality, morphological malformations, and neurotoxicity in zebrafish embryos. Chronic exposure to PCMX at environmentally relevant concentrations (~4.2 $\mu g\ L^{-1}$) can cause gene regulation and morphological changes in rainbow trout. PCMX at environmentally relevant concentrations can promote the spread of antibiotic resistance genes, which is considered a most severe threat to public health in the 21st century.

There thus exists a need for improved disinfectant compositions that overcome at least some of the shortcomings described above.

SUMMARY

The present disclosure relates to the use of dihalobenzoquinones, such as 2,6-dichloro-1,4-benzoquinone (2,6-DCQ), and disinfectant compositions comprising the same as disinfectants capable of inactivating pathogenic microorganisms and is friendly to aquatic ecosystems.

In a first aspect, provided herein is a method of treating an object suspected of being contaminated with one or more microorganisms, the method comprising contacting the object with a disinfectant composition comprising a dihalobenzoquinone and a solvent under conditions such that the disinfectant composition inactivates at least a portion of the one or more microorganisms.

In certain embodiments, the dihalobenzoquinone has Formula 1:

1

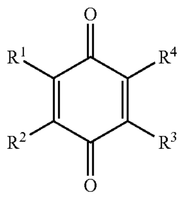

wherein each of $R^1$, $R^2$, $R^3$, and $R^4$ is independently hydrogen, methyl, or a halide, with the proviso that two of $R^1$, $R^2$, $R^3$, and $R^4$ is a halide.

In certain embodiments, the dihalobenzoquinone is selected from the group consisting of:

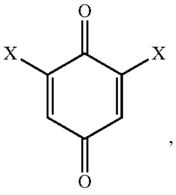
,
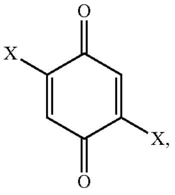
and
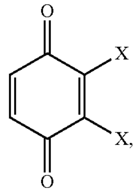

wherein X for each instance is independently chlorine, bromine, or iodine.

In certain embodiments, the dihalobenzoquinone is 2,6-dichloro-1,4-benzoquinone (2,6-DCQ), 2,6-dibromo-1,4-benzoquinone (2,6-DBQ), 2,6-diiodo-1,4-benzoquinone (2,6-DIQ), 2,5-dichloro-1,4-benzoquinone (2,5-DCQ), or a mixture thereof.

In certain embodiments, the one or more microorganisms comprise a bacterium, a fungus, a mold, a virus, or a mixture thereof.

In certain embodiments, the solvent comprises an alcohol, water, or a combination thereof.

In certain embodiments, the alcohol is ethanol, 2-propanol, 2-butoxy ethanol, 1-decanol, benzyl alcohol, glycerin, monoethanolamine, glycols, ethylene glycol, diethylene glycol, propylene glycol, butoxy diglycol, triethylene glycol, tetraethylene glycol, dipropylene glycol, hexylene glycol, glycol ethers, or a combination thereof.

In certain embodiments, the dihalobenzoquinone is present in the disinfectant composition at a concentration of 2 to 10% w/w.

In certain embodiments, the disinfectant composition has a pH between 6.5-7.5.

In certain embodiments, the disinfectant composition further comprises a quaternary ammonium chloride.

In certain embodiments, the quaternary ammonium chloride comprises benzalkonium chloride, benzethonium chloride, or a combination thereof.

In certain embodiments, the disinfectant composition further comprises a surfactant.

In a second aspect, provided herein is a disinfectant composition comprising 2,6-dichloro-1,4-benzoquinone (2,6-DCQ) and a solvent.

In certain embodiments, the solvent comprises an alcohol, water, or a combination thereof.

In certain embodiments, the alcohol is ethanol, 2-propanol, 2-butoxy ethanol, 1-decanol, benzyl alcohol, glycerin, monoethanolamine, glycols, ethylene glycol, diethylene glycol, propylene glycol, butoxy diglycol, triethylene glycol, tetraethylene glycol, dipropylene glycol, hexylene glycol, glycol ethers, or a combination thereof.

In certain embodiments, 2,6-DCQ is present in the disinfectant composition at a concentration of 0.001 to 20% w/w.

In certain embodiments, 2,6-DCQ is present in the disinfectant composition at a concentration of 2 to 10% w/w.

In certain embodiments, the disinfectant composition has a pH between 6.5-7.5.

In certain embodiments, the disinfectant composition further comprises a quaternary ammonium chloride.

In certain embodiments, the disinfectant composition further comprises a surfactant.

2,6-DCQ provides excellent antimicrobial activity (99.9% inactivation at a contact time of 5 minutes) against *Escherichia coli* (ATCC 25922, gram-negative bacteria), *Staphylococcus aureus* (ATCC 25923, gram-positive bacteria) and *Candida albicans* (ATCC 14053, fungi). To achieve 99.9% inactivation of the three types of pathogens at a contact time of 5 min, the in-use doses of PCMX are 10-15 times higher than those of 2,6-DCQ.

2,6-DCQ is prone to degrade in aquatic environments. While 2,6-DCQ remains stable in solid form or in an organic solvent for at least 24 months, it degrades rapidly in aquatic environments, particularly in seawater. The persistence of PCMX in aquatic environments has led to concerns about its adverse effects on ecosystems.

2,6-DCQ poses little environmental risk. Since 2,6-DCQ is rapidly degraded in aquatic environments, it does not accumulate in aquatic environments and thus is much less harmful or damaging to aquatic organisms. In contrast, PCMX has shown potential adverse effects on aquatic organisms at its environmental concentrations with chronic exposure.

2,6-DCQ has an eco-friendly profile and achieves 10-15 times higher disinfection efficacy than PCMX. Therefore, 2,6-DCQ is an effective alternative to PCMX and can be particularly useful in hygiene products for laundry, floors, surfaces and lavatories.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 4 depicts data showing *E. coli* disinfection efficiency (pH 7.2, contact time 5 min) of 2,5-DCQ (2,5-dichloro-1,4-benzoquinone) and 2,6-DCQ at different concentrations; and FIG. 5 depicts data showing *E. coli* disinfection efficiency (pH 7.2, contact time 5 min) of 2,6-DBQ (2,6-dibromo-1,4-benzoquinone), 2,6-DIQ (2,6-diiodo-1,4-benzoquinone) and 2,6-DCQ at different concentrations.

DETAILED DESCRIPTION

Definitions

Figure 1:
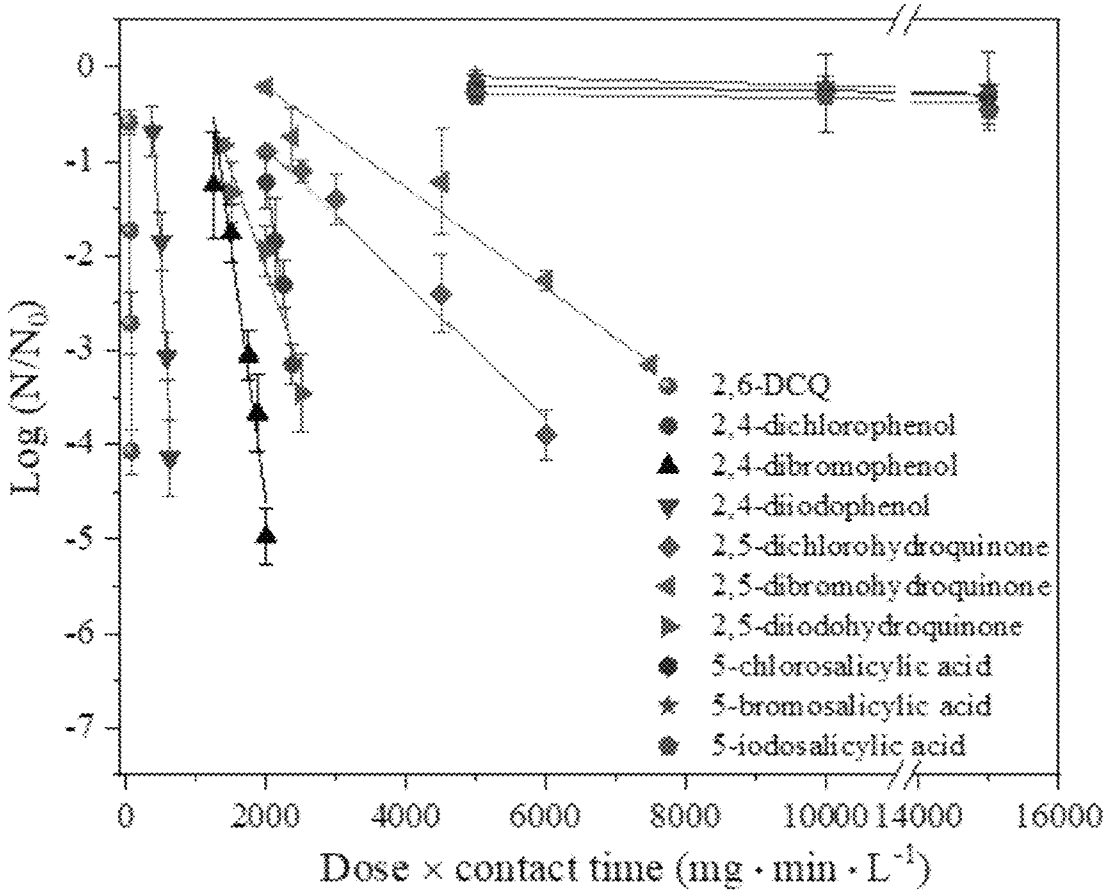
FIG. 1 depicts survivorship curves of *E. coli* for using various disinfection byproducts as disinfectants (pH 7.2, contact time 5 min)

Throughout the present disclosure, unless the context requires otherwise, the word "comprise" or variations such as "comprises" or "comprising", will be understood to imply the inclusion of a stated integer or group of integers but not the exclusion of any other integer or group of integers. It is also noted that in this disclosure and particularly in the claims and/or paragraphs, terms such as "comprises", "comprised", "comprising" and the like can have the meaning attributed to it in U.S. Patent law; e.g., they can mean "includes", "included", "including", and the like; and that terms such as "consisting essentially of" and "consists essentially of" have the meaning ascribed to them in U.S. Patent law, e.g., they allow for elements not explicitly recited, but exclude elements that are found in the prior art or that affect a basic or novel characteristic of the present invention.

Furthermore, throughout the present disclosure and claims, unless the context requires otherwise, the word "include" or variations such as "includes" or "including", will be understood to imply the inclusion of a stated integer or group of integers, but not the exclusion of any other integer or group of integers.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10%, ±7%, ±5%, ±3%, ±1%, or ±0% variation from the nominal value unless otherwise indicated or inferred.

As used herein, the term "isolated" when used in connection with a compound described herein means the compound is separated from some or all of the components that typically accompany it in compositions (such as water or soil samples) that comprise disinfectant byproducts, e.g., formed from chlorination of natural organic matter.

As used herein, the term "inactivation" means that the bacteria are killed or damaged so as to stop bacterial replication.

The present disclosure provides a disinfectant composition comprising a dihalobenzoquinone and a solvent. In certain embodiments, the dihalobenzoquinone is isolated.

In certain embodiments, the dihalobenzoquinone has Formula 1:

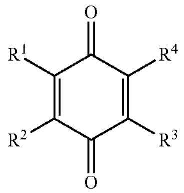

wherein each of $R^1$, $R^2$, $R^3$, and $R^4$ is independently hydrogen, methyl, or a halide, with the proviso that two of $R^1$, $R^2$, $R^3$, and $R^4$ is a halide. The halide can be chlorine, bromine, or iodine. In certain embodiments, the halide is chlorine. In certain embodiments, one or two of $R^1$, $R^2$, $R^3$, and $R^4$ is hydrogen.

In certain embodiments, the dihalobenzoquinone is selected from the group consisting of:

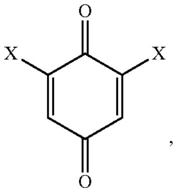 , 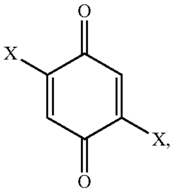 and 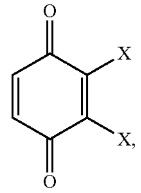

wherein X for each instance is independently chlorine, bromine, or iodine.

Exemplary dihalobenzoquinones include, but are not limited to, 2,6-DCQ, 2,6-DBQ, 2,6-DIQ, 2,5-DCQ, or a mixture thereof. In certain embodiments, the dihalobenzoquinone is 2,6-DCQ.

The solvent is not particularly limited. The present disclosure contemplates all solvents in which the dihalobenzoquinone is at least partially soluble. In certain embodiments, the solvent evaporates at room temperature. In certain embodiments, the solvent comprises an alcohol, water, or mixtures thereof. Exemplary alcohols include, but are not limited to, ethanol, 2-propanol, 2-butoxy ethanol, 1-decanol, benzyl alcohol, glycerin, monoethanolamine, glycols, ethylene glycol, diethylene glycol, propylene glycol, butoxy diglycol, triethylene glycol, tetracthylene glycol, dipropylene glycol, hexylene glycol, glycol ethers, or a combination thereof. In certain embodiments, the solvent comprises 2-propanol or a mixture of 2-propanol and water.

The concentration of the dihalobenzoquinone in the disinfectant composition can range from 0.001 to 20% w/w, 0.01 to 20% w/w, 0.1 to 20% w/w, 1 to 20% w/w, 1 to 15% w/w, 1 to 10% w/w, 2 to 10% w/w, 3 to 10% w/w, 4 to 10% w/w, 5 to 10% w/w, 6 to 10% w/w, 7 to 10% w/w, 8 to 10% w/w, 9 to 10% w/w, 1 to 9% w/w, 1 to 8% w/w, 1 to 7% w/w, 1 to 6% w/w, 1 to 5% w/w, 1 to 4% w/w, 1 to 3% w/w, 2 to 9% w/w, 3 to 8% w/w, 4 to 7% w/w, or 4 to 6% w/w.

In certain embodiments, the disinfectant composition can be provided in concentrated form to e.g., reduce packaging waste and costs. In such embodiments, the concentration of the dihalobenzoquinone in the disinfectant composition can range from 5-20%. The concentrated disinfectant composition can be used directly or optionally diluted by the addition of 1-2,000, 1,000-2,000, 1-1,500, 1-1,000, 1-500, 1-250, 1-100, 1-75, 1-50, 1-25, 1-10, or 1-5 parts water.

The pH of the disinfectant composition can range from 6-8, 6-7.5, 6-7, 6-6.5, 6.5-8, 7-8, 7.5-8, 6.5-7.5, 6.8-7.5, or 6.8-7.2.

In certain embodiments, the disinfectant composition further comprises an additional antimicrobial agent, such as a quaternary ammonium chloride, triclosan, and triclocarban. The quaternary ammonium chloride is not particularly limited. Exemplary quaternary ammonium chlorides include, but are not limited to, benzalkonium chloride, benzethonium chloride, and combinations thereof.

The present disclosure also provides a disinfectant soap composition comprising the disinfectant composition described herein and a surfactant. The surfactant can be a zwitterionic surfactant, a non-ionic surfactant, a cationic surfactant, or an ionic surfactant. In certain embodiments, the surfactant comprises linear alcohol ethoxylate, an amine oxide, a betaine, an amine oxide, a fluorosurfactant, a polysorbate, a sorbitan, sodium lauryl sulfate, an ammonium sulfate, a benzalkonium, a stearalkonium, a hydroxysultaine, and combinations thereof. Exemplary surfactants include, but are not limited to, a C9-C11 alcohol ethoxylate, cocamidopropylamine oxide, cetrimonium chloride, and combinations thereof.

In certain embodiments, the disinfectant composition comprises about 95% (w/w) of 2-propanol as a carrier liquid and 5% (w/w) of the disinfectant ingredient 2,6-DCQ, which is highly effective and eco-friendly. For antimicrobial purposes, the disinfectant can be diluted with water in a volume ratio of 1:1,500; the resulting solution has a pH of about 6.8 and exhibits antimicrobial activities for over 3-log inactivation of pathogens.

The present disclosure provides a method of preparing the disinfectant composition described herein, the method comprising combining the dihalobenzoquinone, optionally a surfactant, optionally a quaternary ammonium chloride, and solvent thereby forming the disinfectant composition.

Also provided herein is a method of treating an object suspected of being contaminated or contaminated with one or more microorganisms, the method comprising contacting the object with a disinfectant composition described herein under conditions such that the disinfectant composition inactivates at least a portion of the one or more microorganisms.

The object can be an animal or a non-animal object. The animal (e.g., a mammal) can include humans, non-human primates, canines, felines, and rodents.

Non-animal objects can include, but are not limited to, surfaces, appliances, food processing equipment, military equipment, personal protective gear, medical devices, domestic objects, and building structures.

The one or more microorganisms can be bacteria, viruses, fungi, molds, or mixture thereof. In certain embodiments, the one or more microorganisms are selected from the group consisting of bacteria and fungi.

2,6-DCQ was tested for its disinfection efficiency and proved to be effective against various types of pathogens. The antimicrobial activities of 10 disinfectants (including 2,6-DCQ, 2,4-dichlorophenol, 2,4-dibromophenol, 2,4-diiodophenol, 2,5-dichlorohydroquinone, 2,5-dibromohydroquinone, 2,5-diiodohydroquinone, 5-chlorosalicylic acid, 5-bromosalicylic acid, and 5-iodosalicylic acid) against *E. coli* were compared. 2,6-DCQ showed a substantially higher disinfection efficacy, with an inactivation rate constant 8.8-500 times greater than those of using other disinfection byproducts as disinfectants. In addition, 2,6-DCQ exhibited excellent antimicrobial activity (99.9% inactivation at a contact time of 5 minutes) against *E. coli, S. aureus* and *C. albicans* at doses of 12.8, 29.4 and 35.7 mg/L, respectively. In comparison, the PCMX doses to achieve 99.9% inactivation of the three types of pathogens at a contact time of 5 minutes were 188, 312 and 325 mg/L, respectively, which were 10-15 times higher than the 2,6-DCQ doses. The inactivation rate constants of 2,6-DCQ against *E. coli, S. aureus* and *C. albicans* were determined to be 5.50, 1.20 and 1.87 $mg^{-1}\cdot h^{-1}\cdot L$, respectively, while the corresponding inactivation rate constants of PCMX were 0.66, 0.21 and 0.21 $mg^{-1}\cdot h^{-1}\cdot L$, respectively.

2,6-DCQ was tested for environmental persistence and proved to be rapidly degradable in aquatic environments, particularly in seawater (the immediate or ultimate receiving waterbody of wastewater effluent or urban runoff). At pH 6.2, 7.2 and 8.2, the half-lives of 2,6-DCQ under solar irradiation were 4.13, 3.20 and 1.33 hours, respectively; the corresponding half-lives in darkness were 65.5, 15.1 and 1.74 hours, respectively. In comparison, the half-lives of PCMX at seawater pH (pH 8.2) with and without solar irradiation were 257 hours and ~240 days, respectively.

2,6-DCQ was tested for toxic potency and proved to pose little risk to aquatic organisms. Due to the rapid degradation of the disinfectant after it is discharged into aquatic environments, it showed lower developmental toxicity to the embryos of a ubiquitous marine polychaete, *Platynereis dumerilii*, than PCMX after 2 hours of degradation in seawater. At 48 hours after discharge into seawater, the disinfectant exhibited 31 times lower developmental toxicity than PCMX to *P. dumerilii* embryos.

Figure 2:
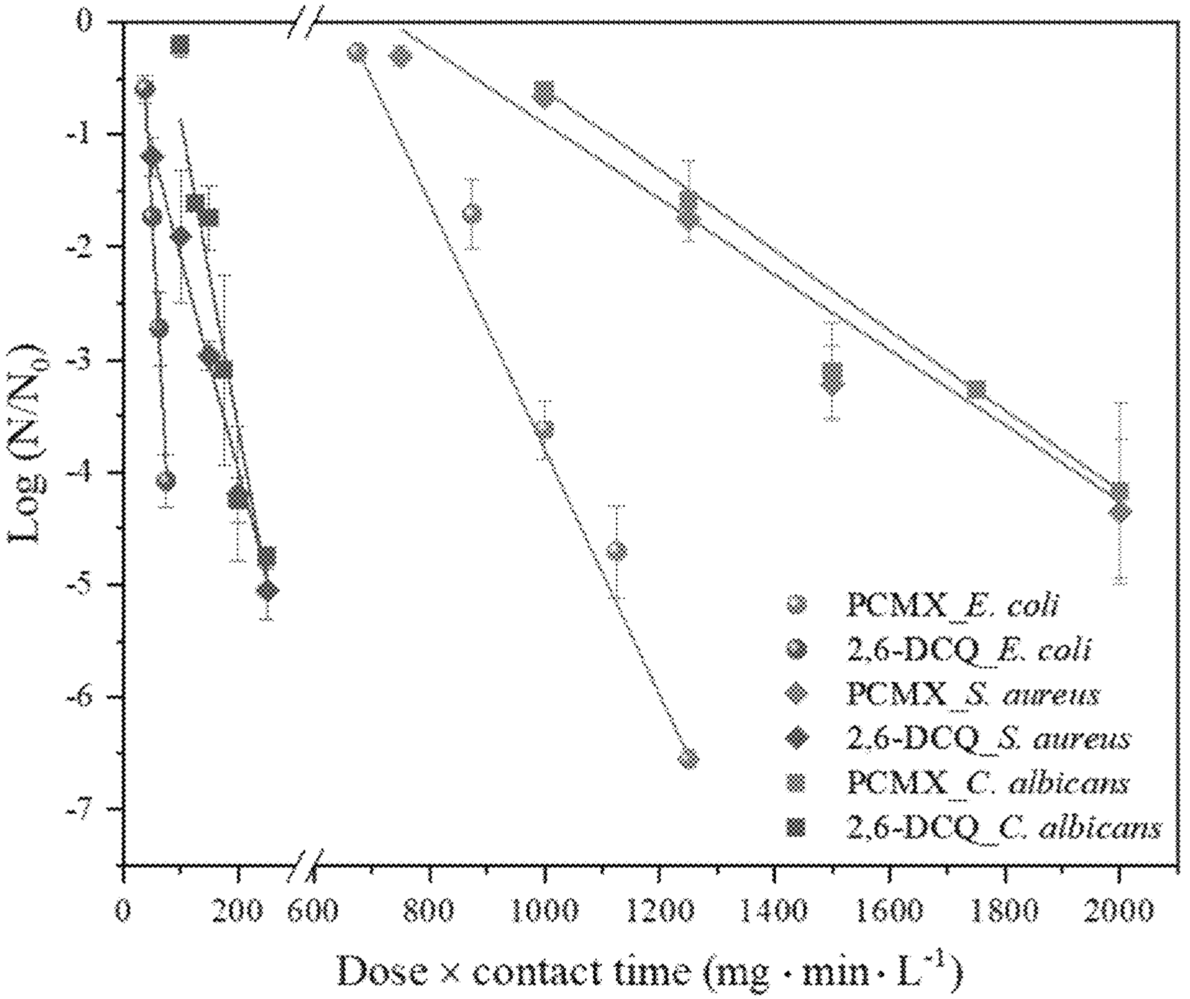
FIG. 2 depicts survivorship curves of *E. coli, S. aureus* and *C. albicans* for using 2,6-DCQ and PCMX as disinfectants (pH 7.2, contact time 5 min)

2,6-DCQ exhibited a superior disinfection efficacy to disinfection byproducts from other groups. The dose of 2,6-DCQ required for 99.9% inactivation of *E. coli* (at a contact time of 5 minutes) was 8.8-500 times lower than those of the other nine disinfection byproducts (FIG. 1). In addition to *E. coli,* 2,6-DCQ also showed excellent antimicrobial activity against *S. aureus and C. albicans*. To achieve 99.9% inactivation of *E. coli, S. aureus* and *C. albicans* for a contact time of 5 min, the in-use doses of 2,6-DCQ were 12.8, 29.4 and 35.7 mg/L, respectively, which were 10-15 times lower than the corresponding in-use doses of PCMX (FIG. 2). The disinfectant doses to achieve 99.9% inactivation of *E. coli, S. aureus* and *C. albicans* were reduced by 89-93% by switching from PCMX to 2,6-DCQ (Table 1). Other dihalobenzoquinones tested, including 2,5-DCQ, 2,6-DBQ and 2,6-DIQ, exhibited comparable disinfection efficacy to 2,6-DCQ (FIGS. 4 and 5).

TABLE 1

Inactivation rate constants and required disinfectant doses for achieving 3-log inactivation of *E. coli*, *S. aureus* and *C. albicans* (pH 7.2, contact time 5 min).

| Pathogen | Disinfectant | Inactivation rate constant ($L \cdot mg^{-1} \cdot h^{-1}$) | Dose (mg/L) |
|---|---|---|---|
| *E. coli* | 2,6-DCQ | 5.50 | 12.8 |
| | PCMX | 0.66 | 188 |
| *S. aureus* | 2,6-DCQ | 1.20 | 29.4 |
| | PCMX | 0.21 | 312 |
| *C. albicans* | 2,6-DCQ | 1.87 | 35.7 |
| | PCMX | 0.21 | 325 |

2,6-DCQ proved to degrade rapidly in aquatic environments. In seawater (pH 8.2), 2,6-DCQ degraded rapidly even in the absence of sunlight, with half-lives with and without solar irradiation of 1.33 and 1.74 hours, respectively. These half-lives were about 200 times shorter than those of PCMX (Table 2).

TABLE 2

Degradation kinetics of PCMX and tested disinfection byproducts with or without solar irradiation.

| | With solar irradiation | | | Without solar irradiation | | |
|---|---|---|---|---|---|---|
| Disinfectant | k ($h^{-1}$) | $R^2$ | Half-life (h) | k ($h^{-1}$) | $R^2$ | Half-life (h) |
| PCMX (pH 8.2) | $2.7 \times 10^{-3}$ | 0.99 | 257 | $1.2 \times 10^{-4}$ | 0.89 | 5578 |
| 2,6-DCQ (pH 6.2) | 0.17 | 0.99 | 4.13 | 0.010 | 0.96 | 65.5 |
| 2,6-DCQ (pH 7.2) | 0.22 | 0.99 | 3.20 | 0.046 | 0.99 | 15.1 |
| 2,6-DCQ (pH 8.2) | 0.52 | 0.99 | 1.33 | 0.397 | 0.99 | 1.74 |
| 2,4-Dichlorophenol | $1.57 \times 10^{-2}$ | 0.994 | 44 | / | / | / |
| 2,4-Dibromophenol | $2.01 \times 10^{-2}$ | 0.991 | 35 | / | / | / |
| 2,4-Diiodophenol | $8.30 \times 10^{-3}$ | 0.996 | 83 | / | / | / |
| 2,5-Dichlorohydroquinone | $1.01 \times 10^{-1}$ | 0.986 | 0.11 | $9.22 \times 10^{-2}$ | 0.978 | 0.13 |
| 2,5-Dibromohydroquinone | $7.87 \times 10^{-1}$ | 0.994 | 0.15 | $7.67 \times 10^{-2}$ | 0.945 | 0.15 |
| 2,5-Diiodohydroquinone | $7.56 \times 10^{-1}$ | 0.982 | 0.15 | $7.80 \times 10^{-2}$ | 0.983 | 0.15 |

Figure 3:
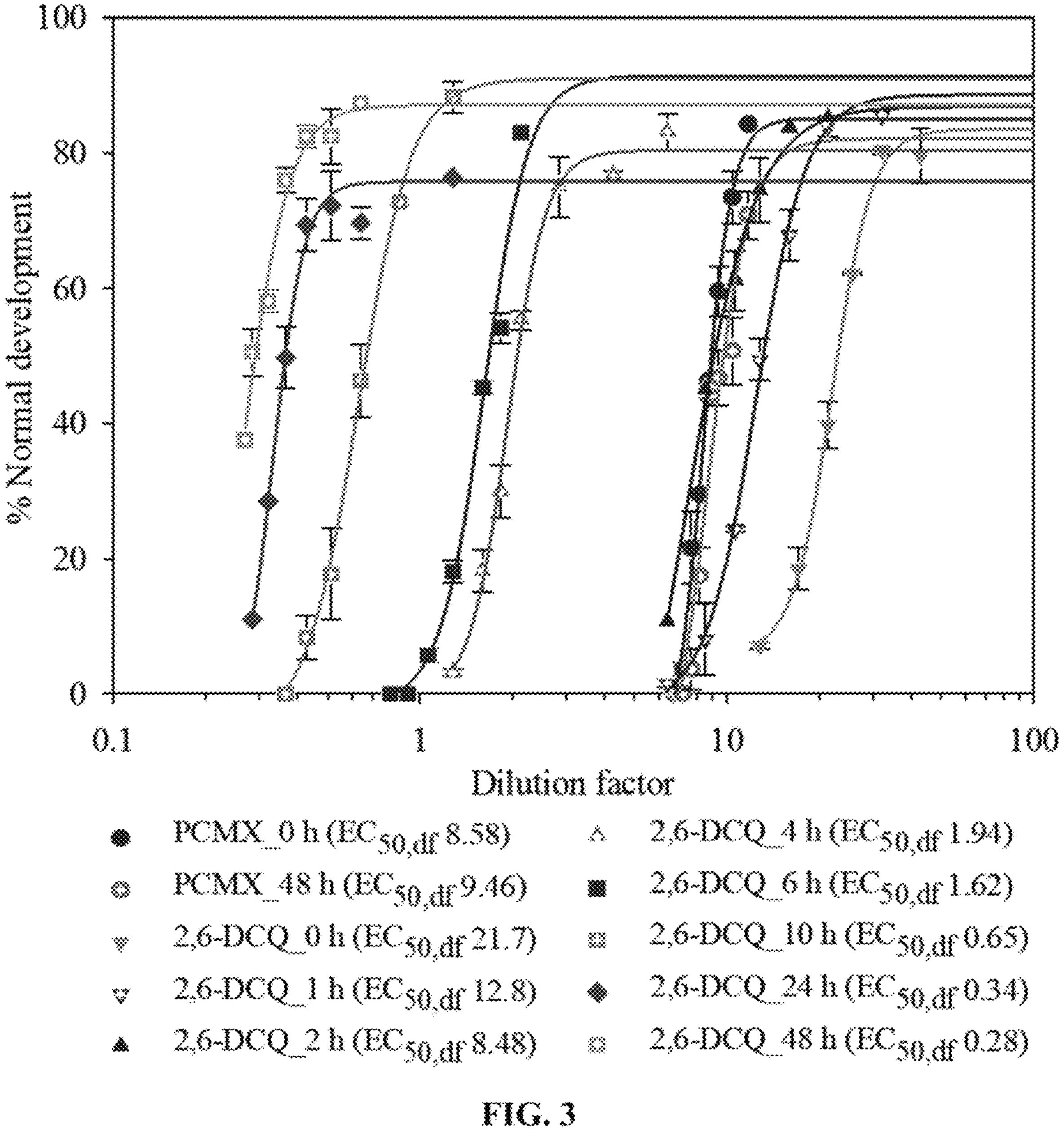
FIG. 3 depicts comparative developmental toxicity of 2,6-DCQ and PCMX solutions to the *P. dumerilii* embryos with different degradation time in darkness.

2,6-DCQ proved to undergo rapid detoxification in seawater. With increasing residence time in seawater, the developmental toxicity of 2,6-DCQ to *P. dumerilii* embryos decreased rapidly. At 48 hours after discharge into seawater, 2,6-DCQ was 31 times less toxic than PCMX to *P. dumerilii* embryos (FIG. 3).

EXAMPLES

Example 1—*E. coli* Disinfection Efficacy of 2,6-DCQ and Selected Disinfection Byproducts Disinfection experiments were performed in phosphate buffer saline (PBS; 10 mM, pH 7.2) with an initial concentration of *E. coli* of $10^6$-$10^7$ colony forming units per milliliter (CFU $mL^{-1}$). Different concentrations of disinfection byproducts were added to the cell suspensions individually at room temperature (~22° C.) with a contact time of 5 min. After the given contact time, the microorganism cells were enumerated following a membrane filter method. Briefly, serial ten-fold dilutions were conducted for the disinfected samples and the control sample without disinfection. Each diluted suspension was subjected to filtration through 0.45-μm membrane, which was then placed on a petri dish containing m-FC medium. After incubation at 45° C. for 24 hours, the colony forming units within a statistically reasonable range (20-80) were counted. The disinfection experiments were performed in duplicate. All the materials for the disinfection experiments were autoclaved at 121° C. for 15 min and cooled to room temperature before use. Results are shown in FIG. 1.

Example 2—Antibacterial Disinfection Efficacy of 2,6-DCQ and PCMX

The disinfection experiments were performed in PBS solutions (10 mM, pH 7.2) with an initial concentration of *E. coli, S. aureus*, or *C. albicans* of $10^6$-$10^7$ CFU $mL^{-1}$. Different concentrations of 2,6-DCQ or PCMX were added to the cell suspensions at room temperature (~22° C.) After the given contact time (i.e., 5 min), the microorganism cells were enumerated following a membrane filter method. Briefly, serial ten-fold dilutions were conducted for the disinfected samples and the control sample without disinfection. Each diluted suspension was filtered through a 0.45-μm filter paper, which was then placed on a petri dish. The petri dishes containing *E. coli, S. aureus*, and *C. albicans* were incubated in m-FC medium at 45° C. for 24 h, Tryptone Soya broth at 37° C. for 24 h, and Sabouraud Dextrose broth at 37° C. for 24 h, respectively. After incubation, the colony forming units within a statistically reasonable range (20-80) were counted. The disinfection experiments were performed in duplicate. All the materials for the disinfection experiments were autoclaved at 121° C. for 15 min and cooled to room temperature before use. Results are shown in FIG. 2.

Example 3—*P. dumerilii* Embryo Developmental Toxicity of 2,6-DCQ and PCMX

The doses of 2,6-DCQ and PCMX for 3-log *E. coli* inactivation (pH 7.2) were set as the in-use concentrations, which were serially diluted and added to the embryos of a marine polychactc, *Platynereis dumerilii*, at 12-hour postfertilization. A dilution factor was defined as the ratio of the in-use concentration to the exposure concentration. Each exposure set contained a control sample (i.e., the embryos at 12-hour postfertilization developed in seawater). By 24-hour postfertilization, normally developed embryos should have reached the first larval stage. An inverted stereomicroscope (40× magnification) was used to observe the larvae. The normal development percentage was calculated as the ratio of normally developed embryos to total embryos. By plotting the curve of the normal development percentage versus the dilution factor, the $EC_{50,DF}$ value (i.e., the dilution factor corresponding to 50% of the normal development percentage of the control sample) was obtained using SigmaPlot 12. The developmental toxicity test was conducted in duplicate. Results are shown in FIG. 3.

Example 4—*E. coli* Disinfection Efficacy of 2,5-DCQ and 2,6-DCQ

The disinfection experiments were performed in PBS solutions (10 mM, pH 7.2) with an initial concentration of *E. coli* of $10^6$-$10^7$ CFU $mL^{-1}$. 2,5-Dichloro-1,4-benzoquinone (7.5 and 15 mg $L^{-1}$) or 2,6-DCQ (7.5 and 15 mg $L^{-1}$) was added to the cell suspensions at room temperature (~22° C.). After the given contact time (i.e., 5 min), the microorganism cells were enumerated following a membrane filter method. Briefly, serial ten-fold dilutions were conducted for the disinfected samples and the control sample without disinfection. Each diluted suspension was subjected to filtration through 0.45-μm membrane, which was then placed on a petri dish. The petri dishes containing *E. coli* were incubated in m-FC medium at 45° C. for 24 hours. After incubation, the colony forming units within a statistically reasonable range (20-80) were counted. The disinfection experiments were performed in duplicate. All the materials for the disinfection experiments were autoclaved at 121° C. for 15 min and cooled to room temperature before use. Results are shown in FIG. 4.

Example 5—*E. coli* Disinfection Efficacy of 2,6-DCQ, 2,6-DBQ and 2,6-DIQ

The disinfection experiments were performed in PBS solutions (10 mM, pH 7.2) with an initial concentration of *E. coli* of $10^6$-$10^7$ CFU $mL^{-1}$. 2,6-DBQ (2,6-dibromo-1,4-benzoquinone), 2,6-DIQ (2,6-diiodo-1,4-benzoquinone), or 2,6-DCQ was added to the cell suspensions at room temperature (~22° C.) with a contact time of 5 min. After the given contact time, the microorganism cells were enumerated following a membrane filter method. Briefly, serial ten-fold dilutions were conducted for the disinfected samples and the control sample without disinfection. Each diluted suspension was subjected to filtration through 0.45-μm membrane, which was then placed on a petri dish. The petri dishes containing *E. coli* were incubated in m-FC medium at 45° C. for 24 hours. After incubation, the colony forming units within a statistically reasonable range (20-80) were counted. The disinfection experiments were performed in duplicate. All the materials for the disinfection experiments were autoclaved at 121° C. for 15 min and cooled to room temperature before use. Results are shown in FIG. 5.

The foregoing description has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated.

What is claimed is:

1. A method of treating an object for contamination with one or more microorganisms, the method comprising contacting the object with a disinfectant composition comprising a dihalobenzoquinone and a solvent under conditions such that the disinfectant composition inactivates at least a portion of the one or more microorganisms, wherein the dihalobenzoquinone has Formula 1:

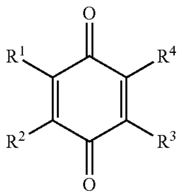

1 wherein each of $R^1$, $R^2$, $R^3$, and $R^4$ is independently hydrogen, methyl, or a halide, with the proviso that two and only two of $R^1$, $R^2$, $R^3$, and $R^4$ are halides; the disinfectant composition has a pH between 6.5-7.5; and the dihalobenzoquinone is present in the disinfectant composition at a concentration of 0.001 to 20% w/w.

2. The method of claim 1, wherein the dihalobenzoquinone is selected from the group consisting of:

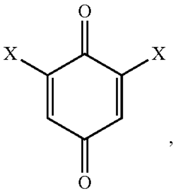
,
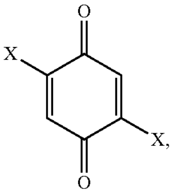
and
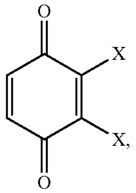

wherein X for each instance is independently chlorine, bromine, or iodine.

3. The method of claim 1, wherein the dihalobenzoquinone is 2,6-dichloro-1,4-benzoquinone (2,6-DCQ), 2,6-dibromo-1,4-benzoquinone (2,6-DBQ), 2,6-diiodo-1,4-benzoquinone (2,6-DIQ), 2,5-dichloro-1,4-benzoquinone (2,5-DCQ), or a mixture thereof.

4. The method of claim 1, wherein the one or more microorganisms comprise a bacterium, a fungus, a mold, a virus, or a mixture thereof.

5. The method of claim 1, wherein the solvent comprises an alcohol, water, or a combination thereof.

6. The method of claim 4, wherein the alcohol is ethanol, 2-propanol, 2-butoxy ethanol, 1-decanol, benzyl alcohol, glycerin, monoethanolamine, glycols, ethylene glycol, diethylene glycol, propylene glycol, butoxy diglycol, triethylene glycol, tetraethylene glycol, dipropylene glycol, hexylene glycol, glycol ethers, or a combination thereof.

7. The method of claim 1, wherein the disinfectant composition further comprises a quaternary ammonium chloride.

8. The method of claim 6, wherein the quaternary ammonium chloride comprises benzalkonium chloride, benzethonium chloride, or a combination thereof.

9. The method of claim 1, wherein the disinfectant composition further comprises a surfactant.

* * * * *